United States Patent
Meyer et al.

(10) Patent No.: US 7,180,427 B2
(45) Date of Patent: Feb. 20, 2007

(54) INFORMATION SYSTEM

(75) Inventors: Rolf Meyer, Wennigsen (DE); Wolfgang Niehoff, Wedemark (DE); Bernd Roth, Langenhagen (DE); Klaus Sanders, Hamburg (DE); Heinz Kuehn, Wedemark (DE)

(73) Assignee: Sennheiser electronics GmbH Co. KG, Wedemark (DE)

( * ) Notice: Subject to any disclaimer, the term of this patent is extended or adjusted under 35 U.S.C. 154(b) by 0 days.

(21) Appl. No.: 11/158,506

(22) Filed: Jun. 21, 2005

(65) Prior Publication Data
US 2005/0245190 A1   Nov. 3, 2005

Related U.S. Application Data

(63) Continuation of application No. 09/806,411, filed as application No. PCT/EP98/06426 on Oct. 9, 1998, now abandoned.

(30) Foreign Application Priority Data
Sep. 30, 1998   (DE) ................. 198 44 809

(51) Int. Cl.
G08B 5/22   (2006.01)
H04Q 1/30   (2006.01)

(52) U.S. Cl. ............................ 340/825.49; 340/7.43

(58) Field of Classification Search ......... 340/825.49, 340/10.1, 10.3, 10.4, 7.2, 7.21, 7.43, 7.51, 340/7.54, 7.46, 7.55; 379/88.05; 704/8
See application file for complete search history.

(56) References Cited

U.S. PATENT DOCUMENTS

| | | | | |
|---|---|---|---|---|
| 5,539,395 A | * | 7/1996 | Buss et al. | 340/7.43 |
| 5,889,473 A | * | 3/1999 | Wicks | 340/7.21 |
| 6,313,735 B1 | * | 11/2001 | Higuchi | 340/7.54 |

FOREIGN PATENT DOCUMENTS

| | | | |
|---|---|---|---|
| DE | 19506890 A1 | * | 8/1996 |
| JP | 5333799 | | 12/1993 |
| JP | 8056183 | | 2/1996 |
| JP | 9018394 | | 1/1997 |
| JP | 09-170929 | | 6/1997 |
| JP | 11252121 | | 9/1999 |

* cited by examiner

Primary Examiner—Wendy R. Garber
Assistant Examiner—William Bangachon
(74) Attorney, Agent, or Firm—Reed Smith LLP

(57) ABSTRACT

An information system for supplying a predetermined region with information includes a transmitter for transmitting information in digitally coded form and a hand-held device. The hand-held device includes a receiver for receiving the information transmitted by the transmitter, a digital memory device for storing the received information, a reproduction device for reproducing the stored information, in particular acoustically and/or optically, and an event detection device for detecting specific events, wherein, upon detection of an event from the stored information, the information which is assigned to the detected event is selected for reproduction.

37 Claims, 5 Drawing Sheets

Block Diagram of the Transmitters

Block Diagram of the Receiver

INFORMATION SYSTEM

CROSS REFERENCE TO RELATED APPLICATIONS

This is a continuation of U.S. application Ser. No. 09/806,411, filed Jul. 5, 2001, now abandoned, which claims priority to International application No. PCT/EP 98/06426, filed Oct. 9, 1998 and German application No. 198 44 809.0, filed Sep. 30, 1998, the complete disclosures of which are hereby incorporated by reference.

BACKGROUND OF THE INVENTION a) Field of the Invention

The present invention relates to an information system for supplying a predetermined region with information.

b) Description of the Related Art

A wireless data information transmission system for exhibitions and museums is known from DE 35 33 705. In this system first infrared transmission/receive devices are disposed at or in the vicinity of an exhibit. Memories which contain selectable, multichannel quantities of information, which can be operated by sensors, in several languages on the respective exhibit are assigned to these infrared transmission/receive devices.

Furthermore, a second (portable) infrared transmission/receive device to be worn by a visitor belongs to the system. When the visitor changes from one location of an exhibit to the location of another exhibit, the second infrared transmission/receive device retrieves the corresponding amount of information on the exhibit. During the operation of this information transmission system, code signals are supplied via sensors to the first infrared transmission/receive devices via a code generator disposed in the second infrared transmission/receive device, which, triggered by the visitor via a start-stop switch, selectively activate acoustic and/or visual reproductions of exhibit-specific or general information from all information contained in the memory and respectively control programmed information sequences.

U.S. Pat. No. 4,824,375 describes a device which can be used for entertainment, for training or for another function, wherein the device keeps ready acoustic information on predetermined objects. The device comprises a static memory, which is disposed in a fixed position in relation to the respective object to be described and a read-only memory, in which in particular the acoustic signals in relationship with the object are digitally stored. Furthermore, the device comprises a reproduction unit which is worn by a user in order to convert the digital information stored in the read-only memory into audible information and to reproduce it for the user. For this the reproduction unit is connected to the static memory so that the digital information can be transmitted to the reproduction device.

A method for the transfer of exhibit-specific information to visitors of exhibitions and museums is known from German Patent Specification DE 35 35 715. In this method the visitor carries a reproduction device and an information device is associated with the respective exhibit. From the information device there is a communications transmission link to the reproduction device. The exhibit-specific information is digitally stored in the information device associated with the exhibit and is available for retrieval. The reproduction device comprises an intermediate memory, a digital/analog converter and at least one electroacoustic transducer or a corresponding connection facility. If exhibit-specific information is to be reproduced, the visitor temporarily produces a data connection between the reproduction device and the information device, so that during this temporarily produced data connection the corresponding information can be transferred. Then this information is converted into acoustic signals and reproduced, whereby the time required for the data transfer is shorter than the time required for the acoustic reproduction.

German Offenlegungsschrift DE 195 06 890 describes a travel information system stored on a data medium for the acoustic and/or optical reproduction of information on landscapes, buildings, towns or historical/artistic events and descriptions for travellers or visitors. The previously stored travel information is reproduced in dependence on the earth coordinates belonging to a particular location or distance, which are determined by satellite signals of known systems (e.g. GPS).

In all of these systems the user carries a portable reproduction device with him, with which information on specific objects, exhibits or the like can be reproduced. With a group of known systems, however, the user previously has to obtain at the location of the object the desired information transmitted to his reproduction device. For this the reproduction device is temporarily coupled with a memory device, which is disposed in the vicinity of the object, and the desired information is transmitted from the memory device to the reproduction device. Therefore the user has to always produce a data transmission connection before the desired information can be reproduced by the reproduction device.

If such data transmission connections are produced with electric plug-in connections, contact problems and thus erroned data transmission may result. This applies, in particular, when the plug-in connections are subject to heavy use, as is to be expected in museums or other public buildings. Furthermore, it should be expected that the practical set-up of the data transmission connection by means of the plug-in connections again and again gives rise to questions on the part of the visitor, so that it is possible that back-up frequently has to be given.

One improvement is promised by the use of an infrared data transmission connection. With such a connection, in particular problems caused by wear and complicated operation are avoided. However, with this alternative too, the fact that, for the transfer of the desired information, the user has to stop in the vicinity of corresponding infrared transmitter and remain there until the transfer has been completed, proves to be disadvantageous.

Furthermore, the user has to accept a noticeable time delay until, after arriving at an interesting object, a reproduction of the transmitted information can take place.

An immediate reproduction of information can be achieved by this already having been stored in the reproduction device prior to the start of a tour. This may take place, for example, by using digital storage media, such as, for example, a CD ROM. In this variant, however, the user regularly has to exchange the reproduction device or the memory medium contained therein if he is situated in a region on which there is no information available in the storage medium.

OBJECT AND SUMMARY OF THE INVENTION

The primary object of the present invention is to make available an information system for supplying a predetermined region with information, in which information of interest to a user can be made available and reproduced for him in a flexible manner and the described disadvantages are avoided. Finally, an information system attractive to the user in every respect, which is also acceptable from cost perspectives, is to be made available.

The object is achieved in accordance with the invention by an information system which comprises a transmitter for transmitting information in digitally coded form and a hand-held device which comprises a receiver for receiving the information transmitted by the transmitter, a digital memory device for storing the received information, which is preferably installed non-detachably in the receiver, a reproduction device for reproducing the memorized information, in particular acoustically and/or optically, and an event detection device for detecting specific events, wherein, upon detection of an event from the stored information, the information which is assigned to the detected event is selected for reproduction.

Furthermore, the object is achieved in accordance with the invention by a method for supplying a predetermined region with information, in which information in digitally coded form is transmitted from a transmitter and received by a receiver contained in a hand-held device and stored in a digital memory device of the hand-held device, whereby, upon detection of an event from the stored information, the information which is assigned to the detected event is selected for reproduction, in particular acoustically or optically.

The advantages of the present invention lie in particular in that information relevant for a user is transferred to the hand-held device without his involvement. The user may consequently move freely in the region covered by the information system and is constantly supplied with information. It is also possible to enlarge the region supplied by the information system without changes to the hand-held device having to be performed, such as, for example, exchange of a static memory. The user also does not have to constantly set up data transmission connections to his hand-held device in order to be able to load new information.

In a preferred embodiment of the information system, the transmission of information from the transmitter to the receiver takes place more quickly than a subsequent reproduction by the reproduction device. Consequently all necessary information can be transmitted in a comparatively short time to the hand-held device and thus is then immediately available for reproduction.

In an advantageous further development, the information is transmitted in several languages. As a result foreign visitors, for example to a trade fair, an exhibition or a museum may also advantageously receive information in their countries' language. In an advantageous further development the hand-held device comprises a selection device for selecting one of the languages in which the information is transmitted. Each user can consequently individually determine in which language the information is to be reproduced for him. To avoid unnecessary occupation of the digital memory device of the hand-held device, in an expedient further development just the information which comprises the language selected by means of the selection device is stored.

In a preferred embodiment of the information system, the event detection device comprises a location determination device for determining the present location, e.g. by GPS (global positioning system), with the event for which the associated information is selected lying within reach of a determined location. To determine the location, the location determination device receives, for example, signals which are emitted by signal generators which are disposed in the region at predetermined locations. With such signal generators it may involve infrared transmitters and/or induction transmitters, which emit a signal characterizing the location.

The region is particularly preferably divided into several information cells, in each of which a transmitter is disposed. The transmitter expediently transmits the information which is assigned to events which can occur in the respective information cell. By such a modular structure of the information system, a small region can be equipped in a particularly economical manner with an information system having just one information cell, and a large region can have a modular structure by several such information cells.

The information system according to the invention comprises at least one transmitter, which transmits multilingual information in digitally coded form on one or more transmission channels. Portable hand-held devices are equipped with a receiver which can receive the digitally coded information. The received information can then be made accessible to a user by a reproduction device integrated in the hand-held device, in particular acoustically. In addition, with the information system according to the invention it is possible to transfer any other data in digitalized form to the hand-held device. Such data may be transmitted directly or after intermediate storage in the hand-held device to a (portable) computer, which for this purpose communicates with the hand-held device. By such a combination of hand-held device and computer one can obtain information in a clear manner on timetables, etc. at bus stops, for example.

At the hand-held device the user can select one of the languages in which the information is transmitted. This may cause, for example, the hand-held device to receive and reproduce, from all the transmitted information, only that information which is transmitted in the selected language. Alternatively the information may also be received in several languages, however of said languages only that information which comprises the selected language is reproduced.

DESCRIPTION OF THE PREFERRED EMBODIMENTS

Figure 1:
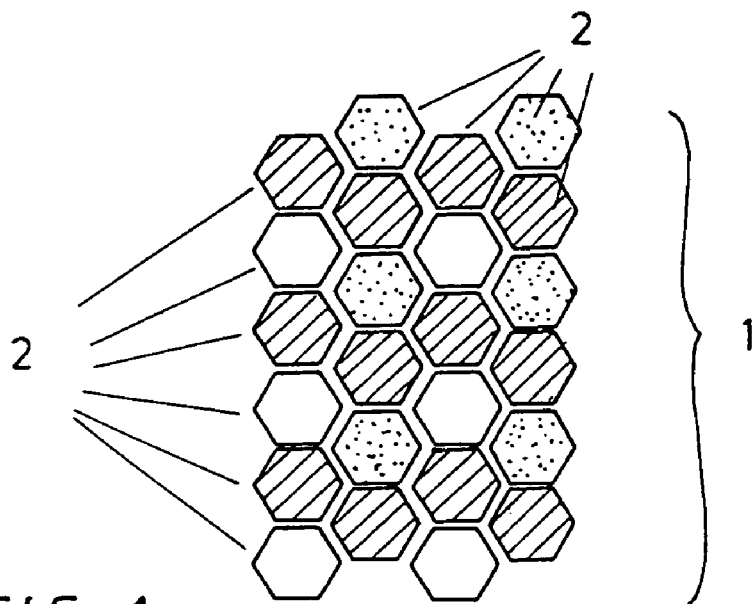
FIG. 1 illustrates in diagrammatical form a region which is supplied with information by the information system of the invention.

FIG. 1 diagrammatically shows a region 1, for example a town, an airport, a trade fair site, a museum, etc., which is supplied with information by the information system specified by the invention. In this case the region 1 can be divided into several information cells 2, with each of which a transmission device is associated.

The boundaries between adjacent information cells are fixed, in particular by limiting the transmission power of the respective transmission devices, by a predetermined antenna characteristic of a transmitting antenna and/or by influencing the radio wave propagation behavior, for example by shielding etc. Furthermore, the transmitters of adjacent information cells work on different frequencies and/or with various (source and/or channel) codes.

The transmitted information is divided into individual information articles which are, for example, documentation on individual objects at determined locations, general background information, person-related communications or live transmitted information, in particular spoken messages, warning messages, music programs, etc.

The information accessible to a user of the information system by means of a hand-held device 11 is divided according to its availability into various groups, which are transmitted by different transmission modes. A distinction is made between event-controlled or location-related information, live information and person-related information.

Event-controlled or location-related information is of interest for the user at determined locations, e.g. information regarding other transport facilities when the user is in the arrivals hall of an airport, information on an exhibit directly in front of said exhibit in a museum or information on a trade fair stand right at its location.

Such information is transmitted just by the transmitter to the information cell in which the corresponding location to which the respective information article relates is situated. The individual information articles are repeatedly transmitted and stored in the hand-held device in an integrated memory device, in which case location-related information previously stored in other information cells are replaced by the present information. All location-related information articles of an information cell in which the user with the hand-held device is located are stored at least to some extent, and as far as possible completely, even if it is not reproduced until a later time or perhaps even not at all.

In this case the transmission of the information takes place many times more quickly than its reproduction by the reproduction device. The ongoing repetition and the short transmission time of the information guarantee that a user has stored all location-related information in his hand-held device for subsequent retrieval shortly after entering an information cell.

In spite of the many times faster transmission of the information in comparison with its reproduction, it takes a certain time until all information articles of an information cell are stored in the hand-held device and are thus available for direct reproduction. The time period which elapses until a particular information article is available to a user for reproduction can be shortened by the initial sections of the individual information articles being transmitted more frequently, i.e. in shorter time intervals in comparison with the remaining end sections. After a comparatively short time period, the initial sections of all information articles are therefore available for reproduction. During the reproduction of an initial section of an information article, the hand-held device may then load the remaining end section of the information article, so that the end section can be reproduced directly after the initial section. As a result, for the user the impression of a continuous information article (program article) without any interruption is produced. Consequently by this method the "waiting time" is clearly reduced to a particular information article, in the ideal case to less than 1 sec and thus shorter than the reaction time of the user.

If the memory capacity of the information memory device integrated in the hand-held device is not sufficient to be able to store all location-related information articles of an information cell and a language, in particular only the initial sections of longer information articles are stored. A reproduction of the entire information articles takes place as represented above.

The hand-held device also comprises a location determination device. The location determination device receives external signals for determining the location.

This includes both the use of navigation systems and the possibility of location determination by distributed signal generators which emit location identifications. The signal generators can be disposed at the corresponding locations to which information articles are transmitted or distributed uniformly in the information cell. For the location determination or as the event initiating the reproduction of location-related information, location identifications are transmitted to the hand-held device by induction loops, inductive tags or infrared transmitters, for example By means of the determined present location or the received location identification, corresponding location-related information is selected and then reproduced for the user either automatically or upon manual request.

By live information is understood those information articles which are current at a determined instant and whose storage makes no sense. Such information is transmitted with the shortest possible time delay and can be made directly accessible (live) to the user—consequently intermediate storage of the live information does not occur.

Included in this group of information are, by way of example, radio programs (also digital-data programmed, e.g. DAB, MPEG audio, AC3 etc.), synchronous versions of films or performances which are just taking place, advertising, communications on special offers or opportunities, news, weather forecasts, etc. However, also cell-overlapping notices such as, for example, a fire alarm, which can be transmitted with a higher priority, so that they can be immediately registered by all users. The information system can be set up so that various items of live information are available on several channels; in each case in all offered languages.

Live information falls into two categories, which place different transmission requirements on the information system. A first category is formed by live information in which the user simultaneously sees optical information, for example a video film. This first category of information (presentation mode) is normally available locally in an information cell and is thus locally supplied and directly transmitted by the respective transmitter. With information of the first category the time delay between the optical information and the corresponding acoustic information has to lie under 10 ms in order to achieve "lip synchronization".

A second category (broadcast mode) is formed by live information, which only includes acoustic information, such as, for example, radio programs, in which no "actor" is to be seen. Such information is normally disseminated via a network into all information cells and transmitted there. The requirements for the transfer of second-category information are not so strict: delays within the second range are permissible.

Person-related information relates to just a particular person and only this person is to receive the communication. This transmission mode functionally corresponds to that of a conventional pager system.

Information articles from this group are generally transmitted a single time, more expediently however in the entire region, i.e. in all information cells, in order to guarantee that the addressed person receives the information. However it may also be expedient to temporarily store the person-related information in order to be able to transmit it repeatedly. To be able to perform an addressing more easily, each hand-held device should have an individual identification and an association between the hand-held devices and the users should be known.

Furthermore, audio information with different band widths and dynamic ranges can be transferred. By means of control information also transmitted for the identification of the received information, this can be correctly converted back into analog audio signals corresponding to its format.

Figure 2:
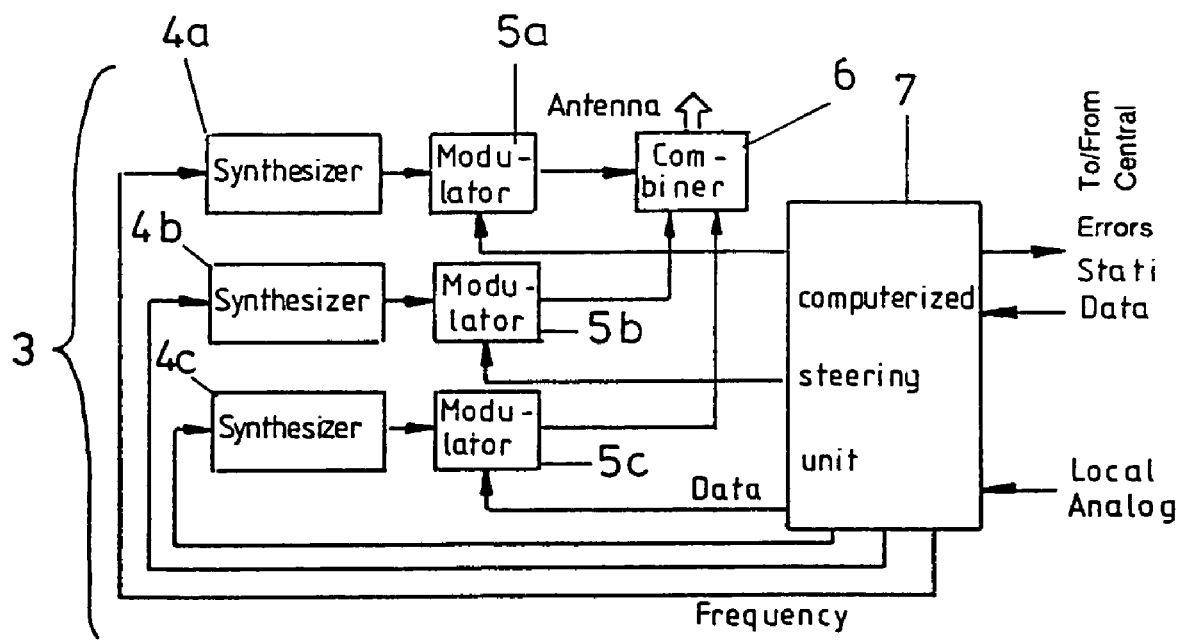
FIG. 2 illustrates in diagrammatical form the structure of a transmitter.

FIG. 2 diagrammatically shows the structure of a transmitter 3. The transmitter 3 has a modular construction and in the represented embodiment comprises three synthesizers 4a–4c and three modulators 5a–5c, the signals of which are combined by a combination circuit 6 (combiner) and are supplied to an antenna, as well as a control unit 7.

The number of synthesizers 4a–4c and modulators 5a–5c can be adapted to the amount of data to be transmitted. Each synthesizer generates a carrier signal and the associated modulators a corresponding RF signal.

The synthesizers 4a–4c and modulators 5a–5c are controlled by the control unit 7. The control unit 7 is equipped with a local information memory device and connected via an input/output interface to a network. Via the network almost all information which is subsequently transmitted is obtained from a central operating unit. Information specific to information cells, such as, for example, local presentations, forms an exception. This can also be locally inputted via a separate input provided at the control unit. The network is also used to transmit status and error messages.

The transfer of information between a transmission and receive device takes place many times more quickly than its reproduction by the reproduction device, in particular in the case of event-controlled or location-related information. In this case known methods for data reduction are also expediently applied.

Figure 3:
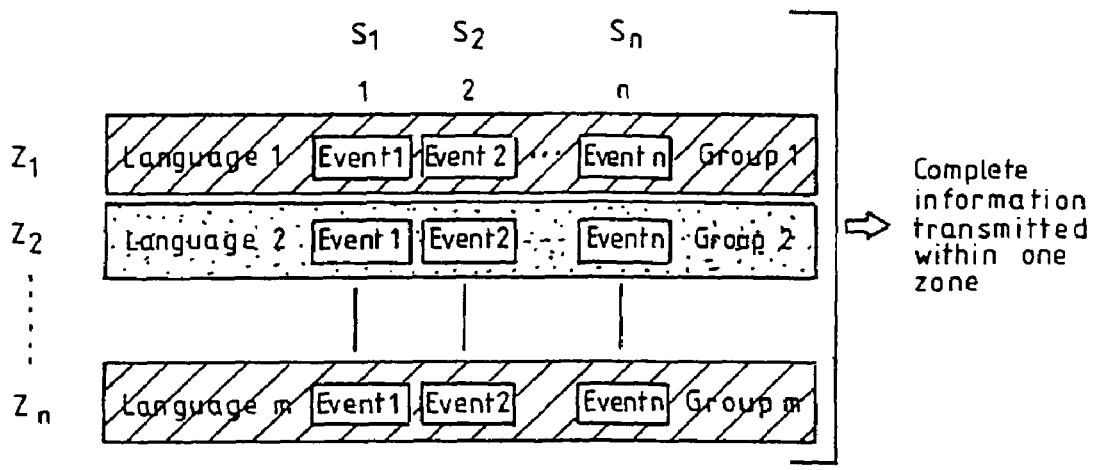
FIG. 3 shows a modulation diagram used for the transmission of all information in an information cell.

FIG. 3 shows a modulation diagram as used for the transmission of all information in an information cell. The modulation diagram follows the structure of a table with lines Z and columns S. Each information article (event) is assigned to a group according to its language, which group is represented by a line in the table. A complete group is modulated on a carrier signal and transmitted. In the event that the number of languages offered is less than the number of groups or carrier signals, a language can then also occupy several groups or carrier signals. Alternatively it is also possible for several or even all language to be transmitted on one frequency.

Figure 4:
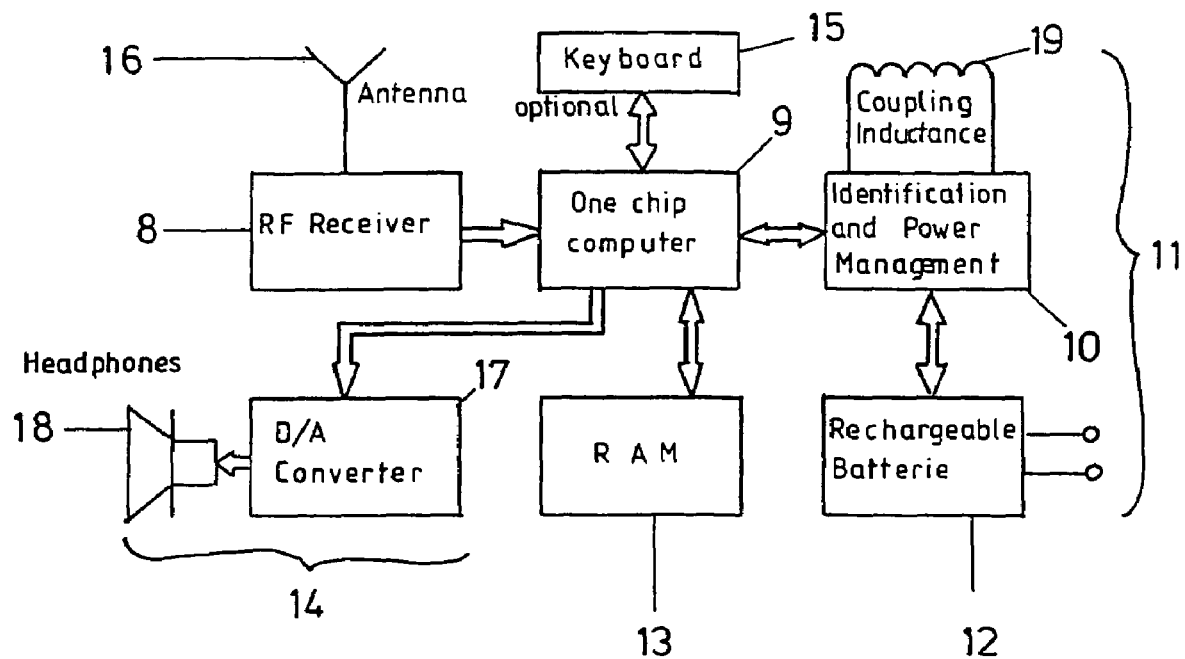
FIG. 4 shows the diagrammatical structure of a hand-held device with a receiver, a control circuit, an energy supply device, a (rechargeable) battery, an information memory device, and a reproduction device.

FIG. 4 shows the diagrammatical structure of a hand held device 11 with a receiver 8, a control unit 9, an energy supply device 10, a (rechargeable) battery 12, an information memory device 13 and a reproduction device 14.The hand-held device 11 may optionally comprise a keyboard 15, which communicates with the control unit 9.

The receiver obtains an RF signal via a connected reception antenna 16 and converts the received RF signal into a stream of digital data, which is subsequently processed by the control unit.

The control unit 9, which may be formed by a one-chip computer or a DSP (digital signal processor), identifies the received information and processes it according to type and priority. E.g. location-related information is stored in the information memory device, while live information is not stored or only briefly for a few seconds or minutes; if an item of live information with higher priority, for example a warning message, is received, the information article presently being transmitted to the user is interrupted and the information with higher priority is immediately reproduced.

Another purpose of the control unit 9 is to make the location-related information stored in the information memory 13 available for reproduction in dependence on the present location.

The reproduction device comprises a D/A converter 17 in order to convert digitally coded acoustic information into an analog signal. The analog signal is then supplied to a loudspeaker 18, a headset or corresponding connections.

The energy supply for the hand-held device may be provided by primary cells. However, rechargeable batteries provided in the hand-held device are more economical. To be able to charge the rechargeable batteries, the energy supply device 10 contains charging contacts with which the hand-held device 11 can be connected to an external energy source.

The hand-held device also comprises an element 19 for the inductive coupling, which represents an interface to external magnetic fields. This coupling element 19 is used to receive the location information transmitted by induction loops. The location identification determined in this manner, which alternatively can also be inputted by means of the optional keyboard or by an infrared interface (not shown), is used by the control unit 9 to find the desired information article in the information memory. Any other coupling, e.g. capacitive, transponder, electromagnetic, optical, etc., is possible.

If only small charging currents are required for the rechargeable batteries, the element for the inductive coupling may also be provided in the power supply device 10. It would then be possible, in electrically insulated manner, to obtain energy for the rechargeable battery of the hand-held device additionally via the element from a corresponding charging station.

The hand-held device 11 may additionally comprise a device for storing an identification of the locations visited by the user and/or of the reproduced information articles. With the identification it is recorded what time interval the user has stopped at a particular location. Alternatively it is possible that, via a corresponding interface, the user passes a value judgement on the quality of a location or information article, which is also stored. If the user leaves the area of the information system or returns the hand-held device 11, the stored data is read out and used for statistical purposes. This data is expediently collated in an output file, which can be read into an external data processing device and further processed by it.

In the short range a transmission of information may take place via an IR (infrared) interface provided in the hand-held device 11. This may be used both as a replacement for as well as in addition to an HF (high frequency) receiver. In addition, small amounts of data may also be transmitted by the magnetic loops and be transmitted to the hand-held device via the element for the inductive coupling.

In an alternative embodiment the RF receiver can even be completely dispensed with. Then the required data may either be transmitted to the hand-held device via the IR interface described above or when charging the batteries via the charging contacts and a corresponding data receiver provided in the energy supply device. In such an embodiment the complete RF infrastructure is not necessary, so that such an information system can be set up very economically.

With the information system, the movements of the individual users in the area of the information system and within the individual information cells may be followed on line. For this the hand-held devices each have to be equipped with a transmitter, which automatically transmits identification pulses in predetermined time intervals. Such a transmission device may be operated for example with RF or IR signals. In addition, corresponding receivers then have to be distributed over the area of the information system and be networked, and they receive the identification pulses and forward them for processing. By corresponding information, which is transmitted to the users, the movements of the users over the area can be controlled or at least influenced.

If the hand-held devices are equipped with a transmitter as described above and corresponding receivers are distributed over the area, these devices may also be used actively by the user. Thus the user may, for example, start or control units or participate by wireless in a ballot.

The user can also use the hand-held device with a special transmitter outside the information system, for example in a private environment, particularly advantageously as a wireless (digital) headset.

Figure 5:
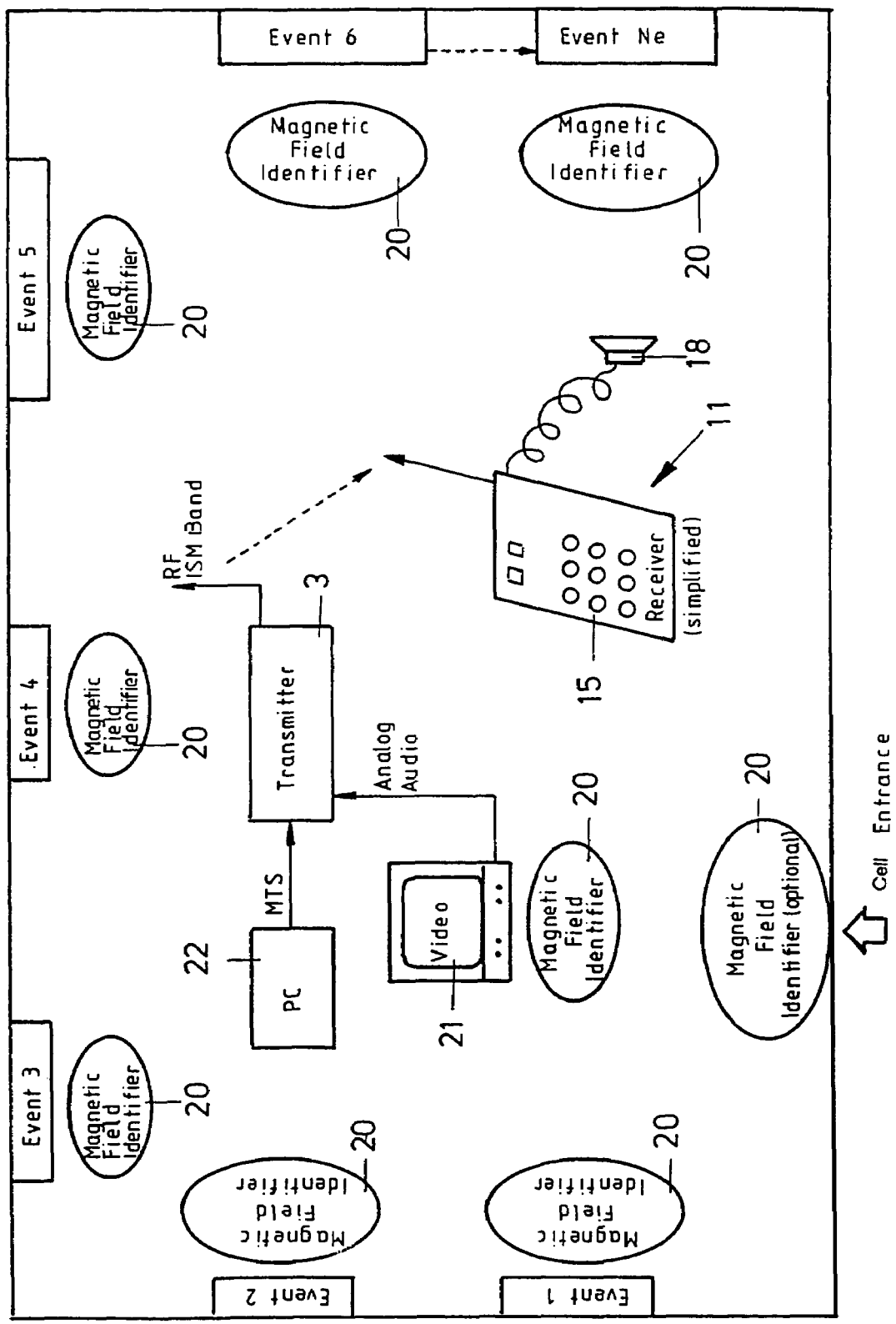
FIG. 5 shows an example of a structure of an information cell.

FIG. 5 shows by way of example a structure of an information cell. Several locations—events I . . . N, for each of which an information article in the various languages can be reproduced, are each equipped with a signal generator. The signal generators generate magnetic fields 20, which serve for the transmission of a location identification to the hand-held device 11. In addition, such a signal generator may optionally be disposed at each entrance to the information cell. In this case the location identification is used to display a change of the present location from one information cell to another to the hand-held device. In this case a selection of an information article does not necessarily have to occur.

If a signal generator is disposed at a location for which live information is offered —for example, shown in FIG. 5 by a monitor 21—the hand-held device 11 selects the corresponding live information so that it can be reproduced for the user automatically or upon manual request. The cell-specific live information can be imported locally via an analog audio input into the transmitter 3. All remaining information articles are already available in memorized form at a computer 22 associated with the transmitter or are obtained via a network from a central operating appliance (not represented).

Figure 6:
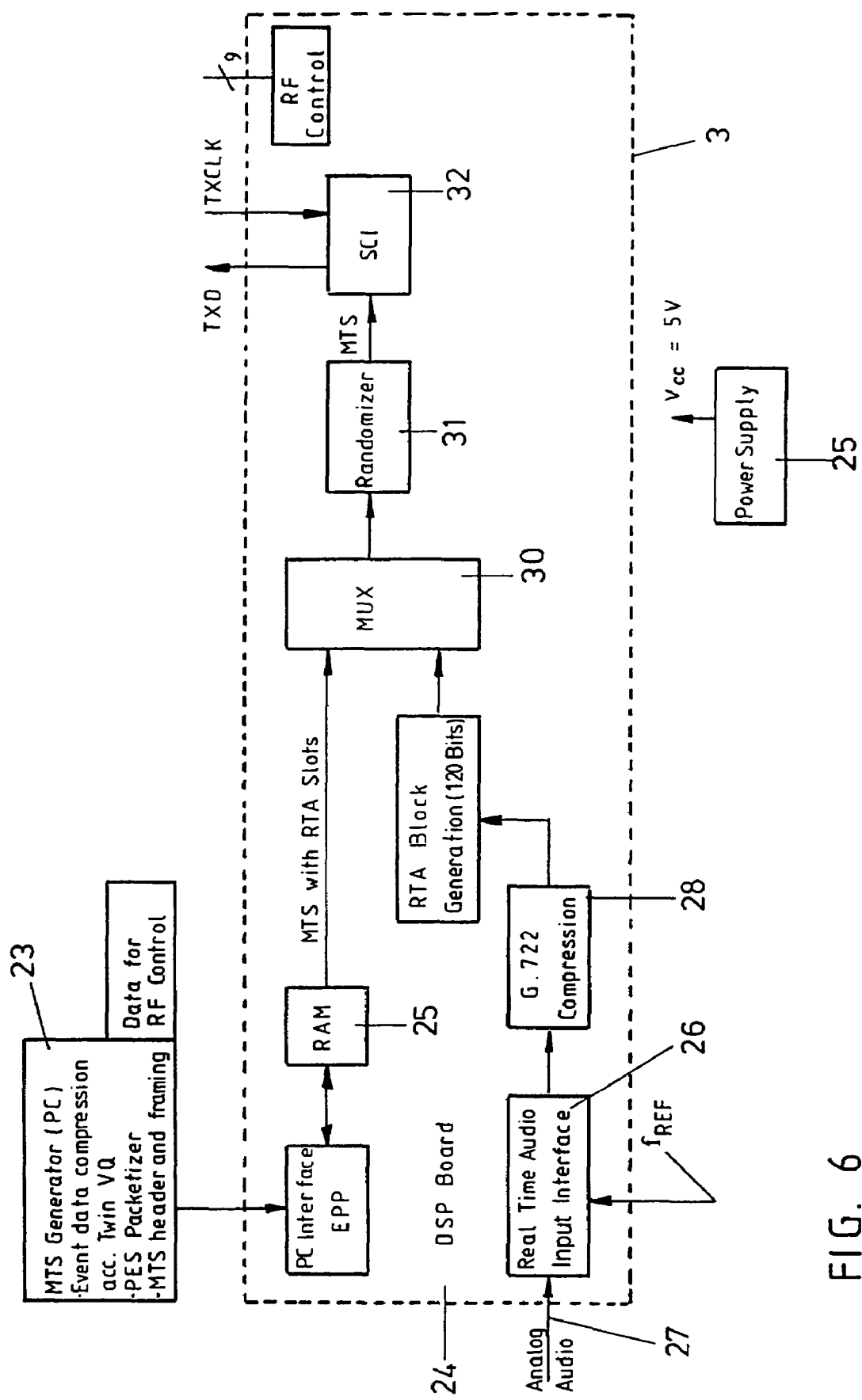
FIG. 6 is a block diagram of a possible embodiment of the transmitter according to the invention.

FIG. 6 shows a functional block diagram of a possible embodiment of the transmitter 3 according to the invention. The transmitter comprises a multiplex transport stream generator 23 (MTS generator), an RF unit, a DSP based real-time signal processing and control unit 24 and an energy supply device 25

In the represented embodiment, the MTS generator is provided by a computer and from the location-related information generates MTS data blocks by means of data reduction in accordance with the twin VQ method and formation of sections of predetermined length. When using a multi-cell structure which comprises several information cells, and with the use of a network for the central supply of the information cells with data, the formation of the MTS data blocks may also take place in a central computing device. The MTS data blocks are then only transmitted via the network to the individual information cells. The MTS data blocks additionally comprise MTS control information for their identification and data slots for real-time audio data. Furthermore, control data for an RF control are transmitted from the computer to the DSP unit 24. The MTS data blocks are transferred via a parallel interface from the MTS generator into the DSP unit 24 and stored there in a (direct access) memory (RAM).

Via an analog audio input and a real-time audio interface 26 (RTA interface) live information, which is to be continuously transmitted with the lowest possible time delay to the hand-held devices 11, can be supplied to the DSP unit 29. In the RTA interface the analog audio signal 27 is digitalized and then subjected by means of a data compression device 28 to a data compression, which can work in accordance with the G.722 method (CCITT guidelines). After the data compression RTA data blocks are formed in an RTA block generator 29.

The DSP unit 24 cyclically repeats the transmission of the individual MTS data blocks from the RAM 25. Here the data blocks are transmitted in the form of a data stream, with the current RTA data blocks being inserted by a multiplexer 30 into the predetermined data window in the MTS data blocks.

In order to prevent long sequences of successive zeros or ones in the MTS data stream, which may have a negative effect during a modulation in the RF unit and during demodulation in a receiver, the data stream is conveyed to a randomizer 31. In the randomizer a pseudo random binary sequence in modulo 2 arithmetic is added to the MTS data stream, the sections of an MTS data block important for a synchronization remaining unchanged.

Then the data stream is supplied via a serial communication interface 32 (SCI) to the RF unit, it being guaranteed by synchronization signals that the frequency of the MTS data stream behaves synchronously to the reference frequency.

Figure 7:
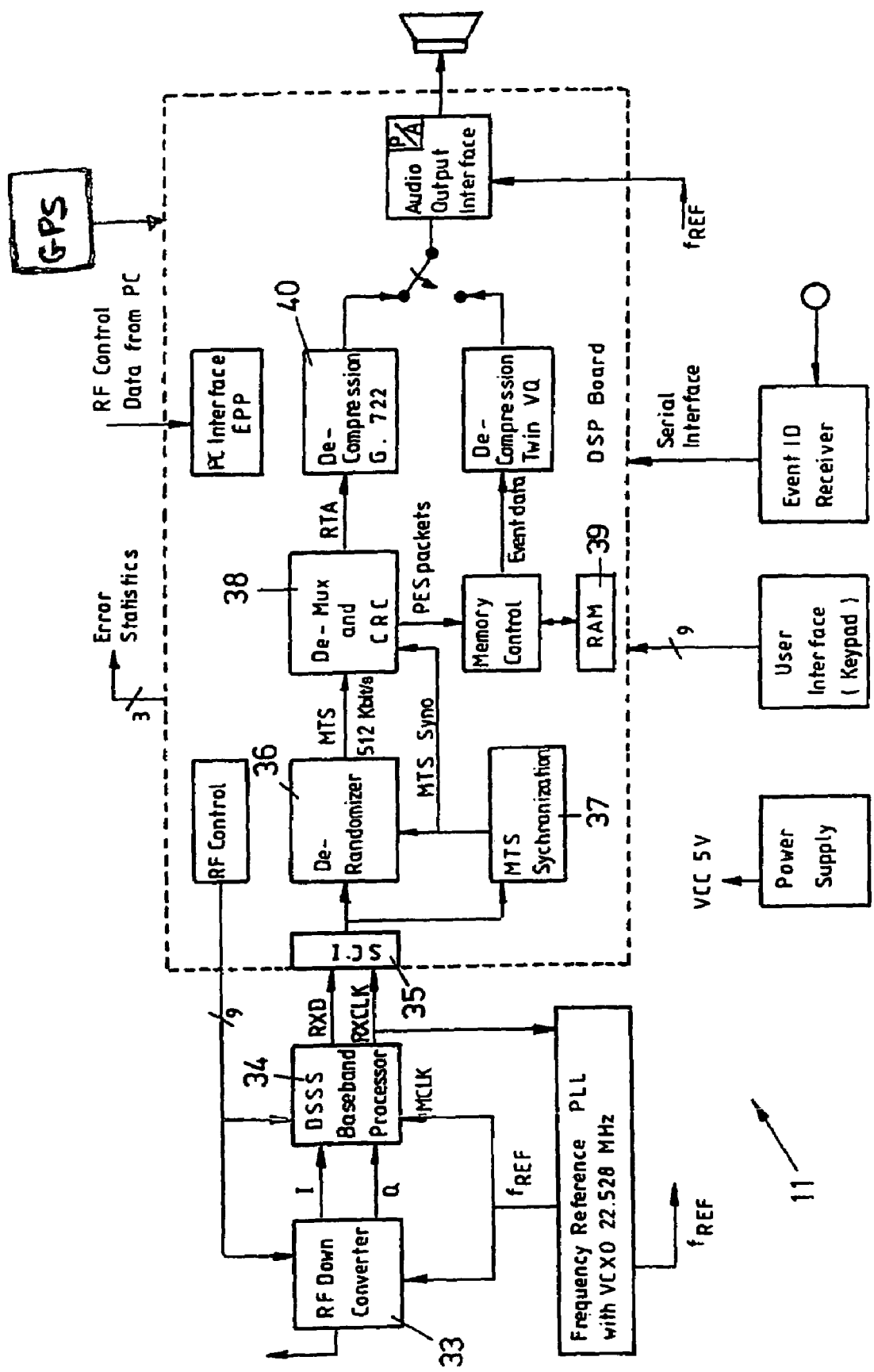
FIG. 7 is a block diagram of a particular embodiment of the hand-held device in accordance with the present invention.

A block diagram of a particular embodiment of the hand-held device 11 is represented in FIG. 7. After converting a received RF signal in an RF down converter 33, a demodulation takes place in a demodulator 34 before the obtained data stream is supplied via a serial communication interface 35 to a derandomizer 36 and an MTS synchronization device 37.

The derandomizer 36 reverses the randomization performed before transmission in that exactly the same pseudo random binary sequence is added in modulo 2 arithmetic to the MTS data stream, the sections of an MTS data block important for a synchronization as for randomization remaining unchanged.

First of all the MTS control data is tested for errors in a demultiplex and error recognition device 38. This can take place by a cyclic redundancy check method (CRC). Then the MTS data blocks belonging to the selected language are extracted. Before these are stored by a memory control device 39 in a (direct access) memory, the CRC method for error recognition is performed on the corresponding data block. At this juncture other known methods for error correction may also be used. Storage 5 does not take place if errors are detected.

The memory procedure for the data blocks of a first information article always starts with the first data block. The first and each further data block is characterized by the first packet indicator (FPI), which is provided in the block control data. Furthermore, the block control data contains a consecutive numbering of the individual data blocks belonging to an information article, more precisely in descending or ascending order.

The first data block thus simultaneously characterizes the entire number of data blocks of the corresponding information article, so that the memory control device can reserve the entire memory required for the storage of this data block after receiving the first data block of an information article. The individual data blocks are stored according to their numbering in the memory areas provided. Data blocks received erroneously are not memorized; the memory region provided for the faulty data block is however kept free and filled upon the next transmission cycle of the same information article. A status display device indicates whether all data blocks have been correctly received. The status display device may, for example, be formed by one or more red and/or green luminous LEDs.

In the event that live audio information is to be reproduced, the RTA data blocks extracted from the data slots of the MTS data blocks are forwarded directly to a G.722 decompression device 40. From there the RTA data blocks travel to the audio reproduction interface and are converted again into analog audio signals.

If a location-related information article is to be reproduced, the memory control device selects the corresponding data blocks from the memory and forwards them to a twin VQ decompression device 41 and from there the data blocks travel to the audio reproduction interface.

Since the received RTA data stream has to be processed precisely at the same data rate in which it was transmitted, the DIA converter is pulsed by the reference frequency $f_{REF}$ formed in the RF unit of the hand-held device.

The invention described above can be used in many different areas such as, for example, in integrative guide and information system for museums, trade fairs, leisure parks, general sights, regions. It can also be used in translation installations, conference installations or search systems, but also as an aid for the blind and hard of hearing. By means of the invention the user (user/visitor) specifically receives information which is primarily of an acoustic nature.

While the foregoing description and drawings represent the present invention, it will be obvious to those skilled in the art that various changes may be made therein without departing from the true spirit and scope of the present invention.

What is claimed is:

1. An information system for supplying a predetermined region with information, comprising:
   a transmitter for transmitting information in digitally coded form; and
   a hand-held device which further comprises a receiver for receiving the information transmitted by the transmitter, a digital memory device for storing the information received, a reproduction device for acoustically and/or optically reproducing the stored information, and an event detection device for detecting specific events, wherein, upon the detection of an event from the stored information, the information which is assigned to the detected event is selected for reproduction,
   wherein the event detection device comprises a navigation system for determining the present location, the event for which the associated information is selected corresponds to reaching a determined location
   wherein the signals for determining the present location are transmitted from a transmitter which is different from the transmitter for transmitting information in digitally coded form
   wherein the determined region is determined by the information system,
   wherein the information is transmitted to the hand-held device without an involvement from the user,
   wherein the information is transmitted to the hand-held device independently of a previously planned route,
   wherein the transmission of the information is performed blockwise and is modulated on a carrier signal.

2. An information system according to claim 1, wherein the transmission of the information from the transmitter to the receiver takes place more quickly than a subsequent reproduction by the reproduction device.

3. An information system according to claim 1, wherein the information is multilingual.

4. An information system according to claim 3, wherein the hand-held device comprises a selection device for selecting one of the languages in which the information is transmitted.

5. An information system according to claim 4, wherein only the information which comprises the language selected by the selection device is stored in the memory device of the hand-held device.

6. An information system according to claim 1, wherein a location determination device receives signals for determining the location,which are emitted by signal generators which are disposed in the region at predetermined locations.

7. An information system according to claim 6, wherein the signal generators are formed by infrared transmitters and/or induction transmitters,each emitting a signal characterizing the location.

8. An information system according to claim 1, wherein the region is divided into several information cells in each of which a transmission device is disposed.

9. An information system according to claim 8, wherein the transmitter transmits the information which is associated to events which can occur in the respective information cell.

10. A method for supplying a predetermined region with information, comprising the steps of:
    receiving information in digitally coded form transmitted from a transmitter, said information
    received by a receiver contained in a hand-held device; and
    storing said information in a digital memory device of the hand-held device;
    whereby, upon detection of an event from the memorized information, the information which is assigned to the detected event is selected for reproduction, acoustically or optically,
    determining the present location by a navigation system,
    wherein the signals for determining the present location are transmitted from a transmitter which is different from the transmitter for transmitting information in digitally coded form
    wherein the determined region is determined by the information system,
    wherein the information is transmitted to the hand-held device without an involvement from the user,
    wherein the information is transmitted to the hand-held device independently of a previously planned route,
    wherein the transmission of the information is performed blockwise and is modulated on a carrier signal.

11. The method according to claim 10, wherein the transmission of the information from a transmission device to a receive device takes place more quickly than a subsequent reproduction by the reproduction device.

12. The method according to claim 10, wherein the information is multilingual.

13. The method according to claim 12, wherein one of the languages in which the information is transmitted is selected at the hand-held device.

14. The method according to claim 13, wherein only that information which comprises the selected language is stored in the memory device of the hand-held device.

15. The method according to claim 10, wherein the event for which the associated information is selected lies within reach of a determined location.

16. The method according to claim 15, wherein the location is determined by signals which are emitted by signal generators which are disposed in the region at predetermined locations.

17. The method according to claim 10, wherein a region is divided into several information cells, in each of which the information is transmitted, which information is assigned to events which may occur in the respective information cells.

18. The method according to claim 10, wherein the step of receiving information further comprises receiving information with a different priority identification is transmitted, with information with a higher priority identification, such as warning messages, being reproduced.

19. The method according to claim 10, wherein the step of receiving information further comprises receiving a plurality of related information articles are transmitted in individual sections, in each case the initial sections of the information articles being transmitted repeatedly in short time intervals, so that after entering an information cell at least the initial sections of the information articles have been stored in the handheld device as quickly as possible, and the following sections are stored for a later reproduction when the reproduction of the first section has already started.

20. An information system for supplying a predetermined region with information wherein the region includes a plurality of information cells, comprising:
  a transmitter located in each information cell and operable to transmit information in digitally coded form which is associated to events in the respective information cell; and
  a hand-held device which includes;
    a receiver for receiving the information transmitted by the transmitter,
    a digital memory device for storing the information received,
    a reproduction device for reproducing the stored information acoustically and/or visually, and
    a navigation device that automatically determines the present information cell the hand-held device is located in, wherein upon determination of the present information cell, the stored information which is associated to events in the determined information cell is selected for reproduction by the reproduction device,
    wherein the signals for determining the present location are transmitted from a transmitter which is different from the transmitter for transmitting information in digitally coded form
    wherein a determined region is determined by the information system,
    wherein the information is transmitted to the hand-held device without an involvement from the user,
    wherein the information is transmitted to the hand-held device independently of a previously planned route,
    wherein the transmission of the information is performed blockwise and is modulated on a carrier signal.

21. The information system according to claim 20, wherein the transmission of the information from the transmitter to the receiver takes place more quickly than a subsequent reproduction by the reproduction device.

22. The information system according to claim 20, wherein the information is multilingual.

23. The information system according to claim 22, wherein the hand-held device comprises a selection device for selecting one of the languages in which the information is transmitted.

24. The information system according to claim 23, wherein only the information which comprises the language selected by the selection device is stored in the memory device of the hand-held device.

25. The information system according to claim 20, wherein the navigation device comprises a GPS device that determines the present location using satellite signals.

26. The information system according to claim 20, wherein the navigation device receives signals for determining the location, which are emitted by signal generators which are disposed in the region at predetermined locations.

27. The information system according to claim 26, wherein the signal generators are formed by infrared transmitters and/or induction transmitters, each emitting a signal characterizing the location.

28. A method for supplying a predetermined region with information wherein the region includes a plurality of information cells, comprising the steps of:
  receiving information in digitally coded form transmitted from a transmitter wherein the transmitted information is associated to events in at least one information cell, said information received by a receiver contained in a hand-held device; and
  storing said information in a digital memory device of the hand-held device;
  upon automatic determination by a navigation device contained in the hand-held device of the present information cell the hand-held device is located in, selecting the stored information which is associated to events in the determined information cell for reproduction acoustically and/or optically,
    wherein the signals for determining the present location are transmitted from a transmitter which is different from the transmitter for transmitting information in digitally coded form
    wherein the determined region is determined by the information system,
    wherein the information is transmitted to the hand-held device without an involvement from the user,
    wherein the information is transmitted to the hand-held device independently of a previously planned route,
    wherein the transmission of the information is performed blockwise and is modulated on a carrier signal.

29. The method according to claim 28, wherein the transmission of the information from a transmission device to a receive device takes place more quickly than a subsequent reproduction by the reproduction device.

30. The method according to claim 28, wherein the information is multilingual.

31. The method according to claim 30, wherein one of the languages in which the information is transmitted is selected at the hand-held device.

32. The method according to claim 31, wherein only the information which comprises the selected language is stored in the memory device of the hand-held device.

33. The method according to claim 28, wherein a navigation device includes a GPS device that automatically determines the present location using satellite signals.

34. The method according to claim 28, wherein a location is determined by signals which are emitted by signal generators which are disposed in the region at predetermined locations.

35. The method according to claim 28, wherein the transmitter transmits information with different priority identification, and the information with a higher priority identification is reproduced first.

36. The method according to claim 28, wherein the step of receiving information further comprises receiving a plurality of related information articles are transmitted in individual sections, in each case the initial sections of the information articles being transmitted repeatedly in short time intervals, so that after the hand-held device enters an information cell at least the initial sections of the information articles have been stored in the hand-held device as quickly as possible, and the sections following the initial sections are stored for a later reproduction when the reproduction of the first section has already started.

37. A hand-held device for receiving, storing and reproducing information in an information system, comprising:

a receiver for receiving digitally coded information which is associated with events in information cells of a region;

a digital memory device for storing the information received;

a reproduction device that reproduces the stored information acoustically and/or optically; and a navigation device that automatically determines the present information cell the hand-held device is located in, wherein upon determination of the present information cell, the stored information which is associated with events in the determined information cell is selected for reproduction by the reproduction device wherein the signals for determining the present location are transmitted from a transmitter which is different from the transmitter for transmitting information in digitally coded form wherein the determined region is determined by the information system, wherein the information is transmitted to the hand-held device without an involvement from the user, wherein the information is transmitted to the hand-held device independently of a previously planned route, wherein the transmission of the information is performed blockwise and is modulated on a carrier signal.

* * * * *

UNITED STATES PATENT AND TRADEMARK OFFICE
CERTIFICATE OF CORRECTION

PATENT NO. : 7,180,427 B2
APPLICATION NO. : 11/158506
DATED : February 20, 2007
INVENTOR(S) : Rolf Meyer et al.

It is certified that error appears in the above-identified patent and that said Letters Patent is hereby corrected as shown below:

TITLE PAGE:

[75]  Inventors  change 5th inventor from  "Heinz Kuehn, Wedemark (DE)"
                 to                           --Hans Kuehn, Wedemark (DE)--

[73]  Assignee:  change from  "Sennheiser electronics GmbH Co. KG"
                 to           --Sennheiser electronic GmbH & Co. KG--

IN THE SPECIFICATION:

Column 6,   line 34,   change from  "user—consequently"
                       to           --user — consequently--

Column 7,   line 58,   change from  "hand held"
                       to           --hand-Held-- line 61,   between   "14." and "The" insert a space

Column 9,   line 28,   change from  "locations—events"
                       to           --locations - events-- line 41,   change from  "offered—for"
                       to           --offered-for-- line 42,   change from  "21—the"
                       to           --21 - the-- line 56,   after   "25" insert a period --.--

Column 11,  line 28,   change from  "DIA"
                       to           --D/A--

UNITED STATES PATENT AND TRADEMARK OFFICE
CERTIFICATE OF CORRECTION

PATENT NO. : 7,180,427 B2
APPLICATION NO. : 11/158506
DATED : February 20, 2007
INVENTOR(S) : Rolf Meyer et al.

It is certified that error appears in the above-identified patent and that said Letters Patent is hereby corrected as shown below:

IN THE CLAIMS:

Column 11
| | | | |
|---|---|---|---|
| Claim 1, | line 61, | after "location" | insert a comma --,-- |
| | line 65, | after "form" | insert a comma --,-- |

Column 12
| | | | |
|---|---|---|---|
| Claim 6, | line 23, | between | "location," and "which" insert a space |
| Claim 7, | line 27, | between | "transmitters," and "each" insert a space |
| Claim 10, | line 52, | after "form" | insert a comma --,-- |

Column 13
| | | | |
|---|---|---|---|
| Claim 20, | line 41, | change from to | "includes;" --includes:-- |

Column 14
| | | | |
|---|---|---|---|
| Claim 26, | line 20, | between | "location," and "which" insert a space |

Column 16
| | | | |
|---|---|---|---|
| Claim 39, | line 11, | after "device" | insert a comma --,-- |
| | line 15, | after "form" | insert a comma --,--. |

Signed and Sealed this

Eighteenth Day of September, 2007

JON W. DUDAS
*Director of the United States Patent and Trademark Office*